US012584774B2

(12) United States Patent
Daniel

(10) Patent No.: US 12,584,774 B2
(45) Date of Patent: Mar. 24, 2026

(54) NON-OBSTRUCTIVE HIGH-SENSITIVITY FLOWMETER

(71) Applicant: Notation Labs, Inc., Scottsdale, AZ (US)

(72) Inventor: David A. Daniel, Scottsdale, AZ (US)

(73) Assignee: Notation Labs, Inc., Scottsdale, AZ (US)

( * ) Notice: Subject to any disclaimer, the term of this patent is extended or adjusted under 35 U.S.C. 154(b) by 0 days.

(21) Appl. No.: 18/896,825

(22) Filed: Sep. 25, 2024

(65) Prior Publication Data

US 2025/0102337 A1      Mar. 27, 2025

Related U.S. Application Data

(60) Provisional application No. 63/540,928, filed on Sep. 27, 2023.

(51) Int. Cl.
G01F 1/667 (2022.01)
G01F 1/66 (2022.01)
(52) U.S. Cl.
CPC .............. G01F 1/667 (2013.01); G01F 1/662 (2013.01)
(58) Field of Classification Search
USPC ...................................................... 73/861.25
See application file for complete search history.

(56) References Cited

U.S. PATENT DOCUMENTS 4,596,133 A * 6/1986 Smalling ................. G01P 5/245
73/24.01

FOREIGN PATENT DOCUMENTS

EP          0650035 A1 *  4/1995  ............. G01F 1/662
WO    WO-2014029404 A1 *  2/2014  ............. G01F 1/662

OTHER PUBLICATIONS

Translation of EP-0650035-A1 (Year: 1995).*

* cited by examiner

*Primary Examiner* — Nathaniel T Woodward
(74) *Attorney, Agent, or Firm* — CM Law LLP; Robert C. Klinger

(57) ABSTRACT

A flowmeter including a body having a wall configured to communicate a fluid between an inlet and an outlet, and an ultrasonic transducer configured to transmit an ultrasonic signal to another ultrasonic transducer along a path in the body. A plurality of reflectors are disposed in the wall and are configured to reflect the ultrasonic signal multiple times across the body along the path in the fluid flowing through the housing. A processor is coupled to the ultrasonic transducers and is configured to determine a time the ultrasonic signal takes to travel the path and determine a flow rate of the fluid as a function of a determined time.

18 Claims, 6 Drawing Sheets

NON-OBSTRUCTIVE HIGH-SENSITIVITY FLOWMETER

TECHNICAL FIELD

This disclosure relates generally to the field of whole-home electronic water control systems, in particular water leak detection, and water analytics.

BACKGROUND

Water leak-related property damage causes homeowners billions of dollars in damage every year in the United States alone. The single most important factor in mitigating property damage caused by leaks is the amount of time it takes for the leak to be discovered and the water shutoff. The longer it takes to respond, the greater the damage incurred.

DETAILED DESCRIPTION

A flowmeter including a body having a wall configured to communicate a fluid between an inlet and an outlet, and an ultrasonic transducer configured to transmit an ultrasonic signal to another ultrasonic transducer along a path in the body. A plurality of reflectors are disposed in the wall and are configured to reflect the ultrasonic signal multiple times across the body along the path in the fluid flowing through the housing. A processor is coupled to the ultrasonic transducers and is configured to determine a time the ultrasonic signal takes to travel the path and determine a flow rate of the fluid as a function of a determined time.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples in order to provide a thorough understanding of the relevant teachings. However, it should be apparent to those skilled in the art that the present teachings may be practiced without such details. In other instances, well-known methods, procedures, components, and circuitry have been described at a relatively high-level, without detail, in order to avoid unnecessarily obscuring aspects of the present teachings.

It is to be understood that the figures and descriptions of the present disclosure have been simplified to illustrate the details that are relevant for a dear understanding of the present disclosure, while eliminating, for the purpose of clarity, certain details found in the supporting electronics. Those of ordinary skill in the art will recognize that other details are required in implementing the present disclosure. However, because these other details are well known in the art, and do not add to the understanding of the present disclosure, a discussion of these details is not provided herein.

The term "coupled" as used herein refers to any logical, optical, physical or electrical connection, link or the like by which signals, or light produced or supplied by one system element are imparted to another coupled element. Unless described otherwise, coupled elements or devices are not necessarily directly connected to one another and may be separated by intermediate components, elements or communication media that may modify, manipulate or carry the light, sound, or signals.

Figure 1:
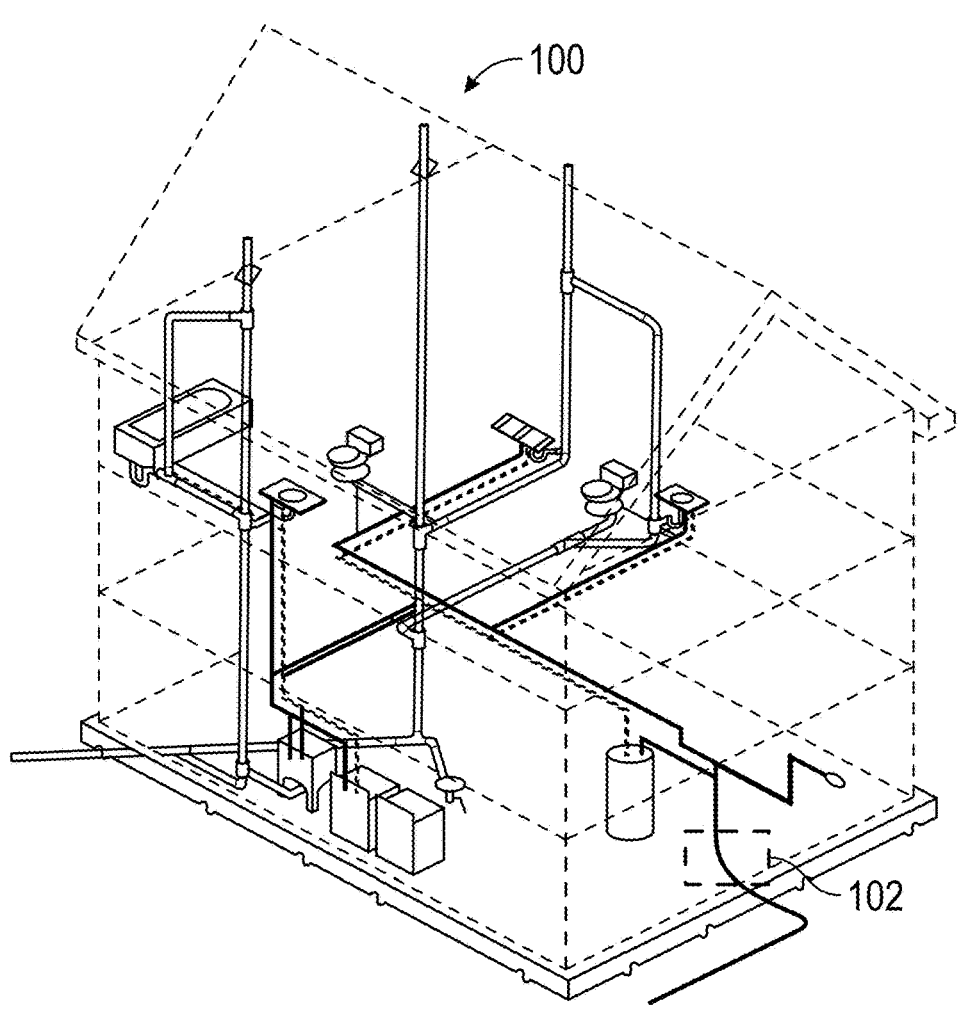
FIG. 1 is a perspective view of a home having a flowmeter detector installed in-line with the main water entry to home.

Whole-home water leak detectors are a particular type of leak detector that is installed on the main water line at the entry to the home, generally after sprinkler systems but before other plumbing fixtures of the home. FIG. 1 illustrates a home 100 having a leak detector 102 installed in line with the main water entry to home 100.

Leak detectors in a simple form consist of electronics and onboard software configured to control the leak detector and a flowmeter to determine water flow through the leak detector. Some leak detectors only detect leaks and then trigger an alarm to alert the homeowner but take no further action. However, many leak detectors also incorporate a motorized valve (they are installed in-line) to enable automatic and manual opening and closing (shutoff) of the water line to the home in the event a leak is detected. Automatic shutoff valves ensure a quick response time to limit damage in the event of a water leak.

Smart leak detectors make it easier and more convenient for homeowners to detect water leaks. The term "smart" in the context of leak detection typically means the leak detector is connected via a communication network to a backend server where water flow analysis is performed. Such analysis may or may not include some sort of machine learning to interpret and respond based on the water flow data. Smart leak detectors typically come with companion software applications ("apps") that provide water usage monitoring. Water flow data collected from the leak detector is presented in the app in summary form to the user, typically in the form of a chart. Users can use this feature to view detailed records of the leak event and also track their water usage over time.

With whole-home water monitoring, a sensing package and network connectivity enables homeowners to monitor and assess all aspects of their water usage—not just leak detection and flow data. Water quality analysis provides a critical missing piece of information that homeowners need to effectively manage their water supply.

Flowmeters are devices for determining the flow rate of a medium (typically liquid or gas) through a delivery channel (typically a pipe). Many types of flowmeters have been developed over the years based on a range of methods for determining flow rate. These include but are not limited to mass flow meters, positive displacement flow meters, electromagnetic flow meters, vortex flow meters, ultrasonic flow meters, turbine flow meters, and impeller flowmeters. Each of these types of flowmeters have characteristics and tradeoffs that make them suitable for the requirements of a given application.

Whole home water leak detection systems have requirements that make selection of a flowmeter particularly challenging. Flowmeters for whole home leak detection systems must provide highly sensitive water flow measurements across an extremely wide dynamic range, from less than 0.2 gallons per hour (GPH) in the case of a slow "pin-hole" type leak to 10 gallons per minute (GPM) or more in the case of a pipe burst, and low pressure drop across the flowmeter even at the high end of its dynamic flow range. The flowmeters must be resistant to degradation over time and jamming by hardwater deposits and particulates inherent to the water piping environment. These characteristics must be achieved in a small physical space, at a relatively low financial cost.

Typically, flow meters that have optimal characteristics are industrial in nature and not available at a price point that is practical for use in whole home water leak detection systems. Flow meters that are practical (low-cost turbine and impeller types), are typically inaccurate, have moving parts that wear out too quickly, and/or produce high resistance to flow such that there is a significant pressure drop across the flow meter, thereby unacceptably restricting the flow of water when installed on a home main water line. For these reasons, ultrasonic flowmeters are a superior choice for whole home water leak detector and water monitoring systems.

Figure 2:
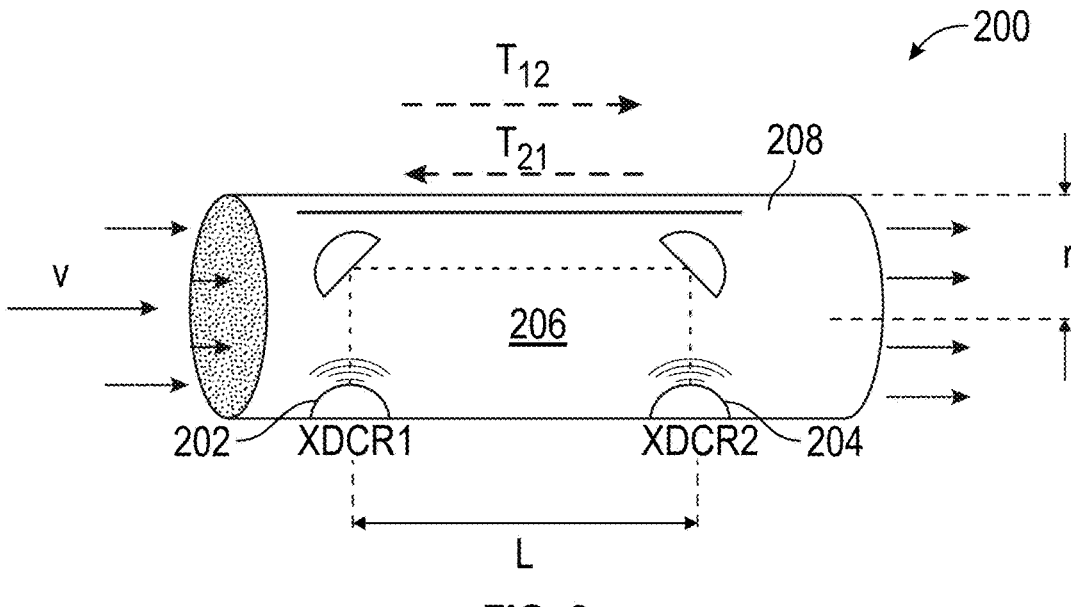
FIG. 2 illustrates a basic ultrasonic water flowmeter.

A basic ultrasonic water-flow meter design, as shown at 200 in FIG. 2, is based on the principle of Time-of-Flight (ToF) measurement. ToF measurement refers to the time it takes for a signal to travel from a ultrasonic transmitting transducer to a receiving transducer through the water flow 206. The propagation time of a signal traveling from the first transducer 202 (XDR1) to the second transducer 204 (XDR2), in the water flow in a direction of the water flow, is given by time $T_{12}$ in FIG. 2. Time $T_{21}$ represents the propagation time of the signal traveling in the water flow in the opposite direction (against the water flow). The propagation times differ when there is water flow passing the transducers and are a function of the velocity of the ultrasound signal in water and the velocity of water flow. The basic equations are as follows for calculating the water flow, where c is the velocity of the ultrasound signal in the medium, v is the velocity of water flow, and L is the propagation length of the pipe 208 along the flow of water.

$$T_{12} = L/(c + v)$$

$$T_{12} = L/(c + v)$$

$$\Delta t = T_{21} - T_{12}$$

These equations can be used to determine the velocity of water flow (v). The water flow (v) is derived from simultaneous Equations 1 and 2 by eliminating c:

$$v = (L/2) * (\Delta t/(T_{12} * T_{21}))$$

The flowrate in gallons per minute is given by equation below, where Q is the volumetric flow rate (i.e., gpm or lpm, etc.), v is the velocity and A is the cross-sectional area of the pipe 208 ($A=\pi*r^2$).

$$Q = v * A$$

The longer the distance L, the greater the $\Delta t$. Therefore, flowmeters that implement a longer signal path through the flowing water produce greater differences in the ToF and therefore are able to detect smaller changes in flowrate (greater sensitivity).

This disclosure relates to an improved ultrasonic type of flowmeter for whole home leak detection and in particular, whole home water monitoring applications. The disclosure advantageously supports a clear non-obstructing water flow path, while extending the signal path through the flowing water and therefore achieving relatively larger differences in ToF to achieve best in class sensitivity to flow variations.

Figure 3:
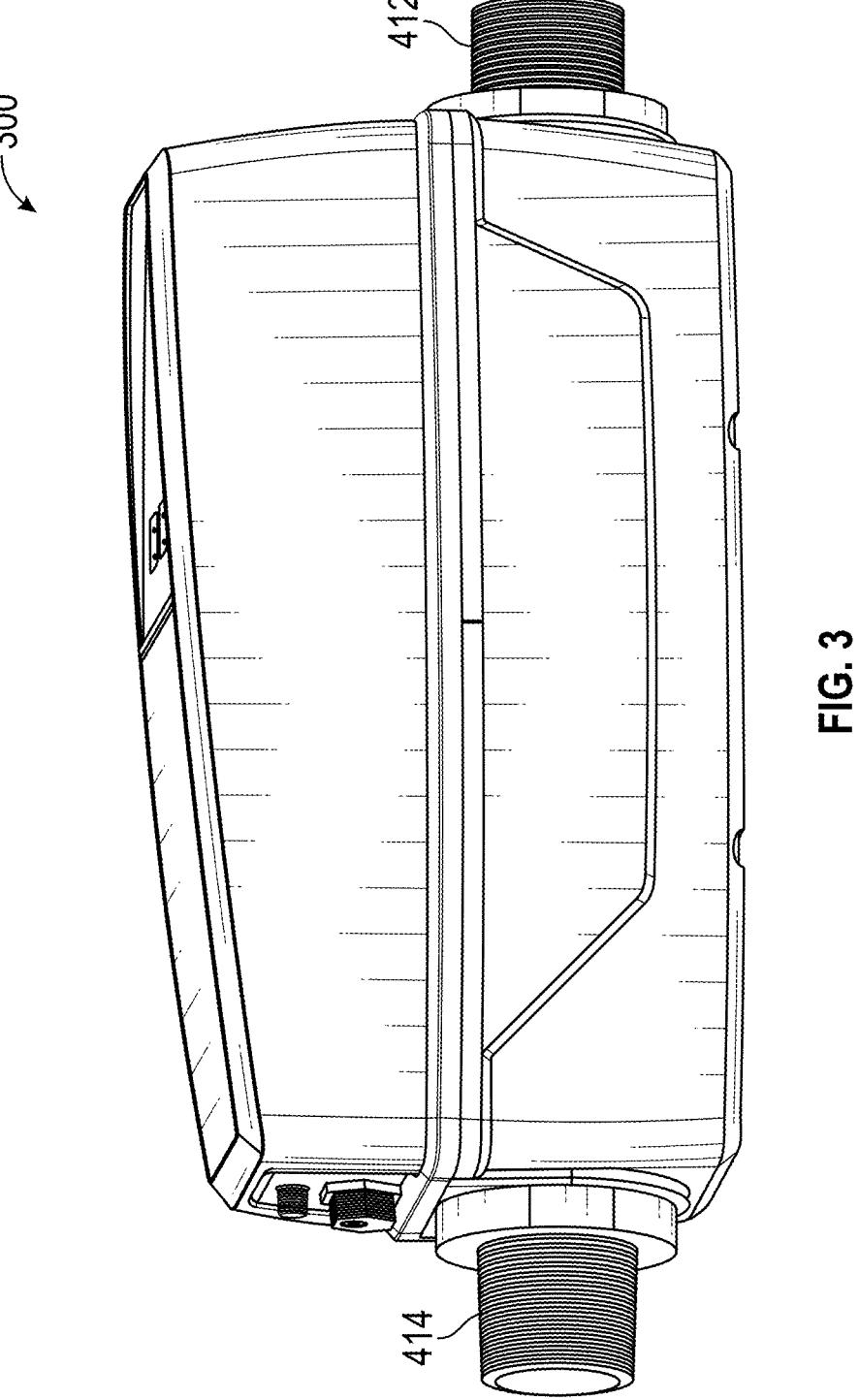
FIG. 3 illustrates a perspective view of a system including an improved flowmeter.
Figure 4:
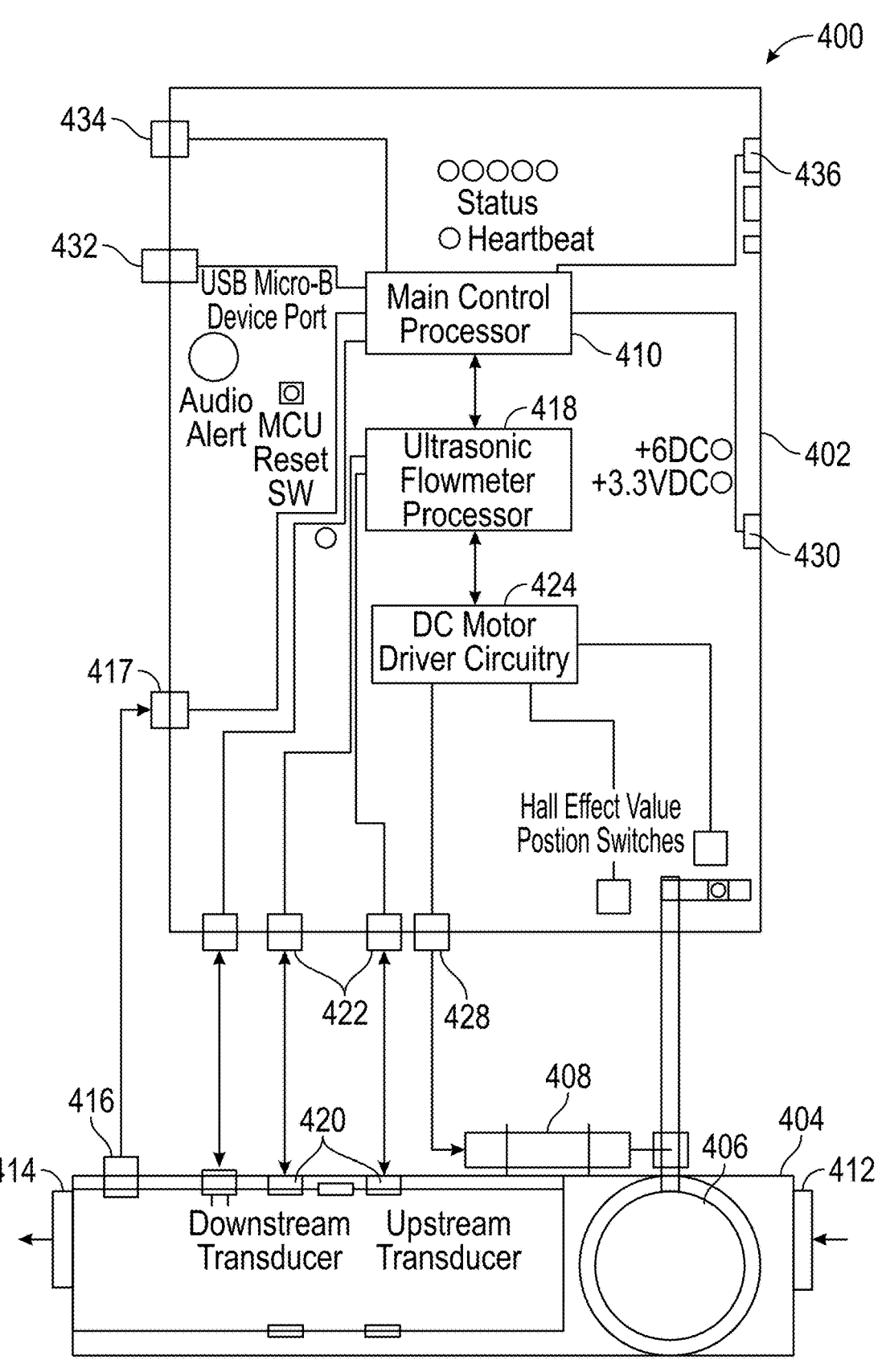
FIG. 4 illustrates a system block diagram of system including the flowmeter.
Figure 5:
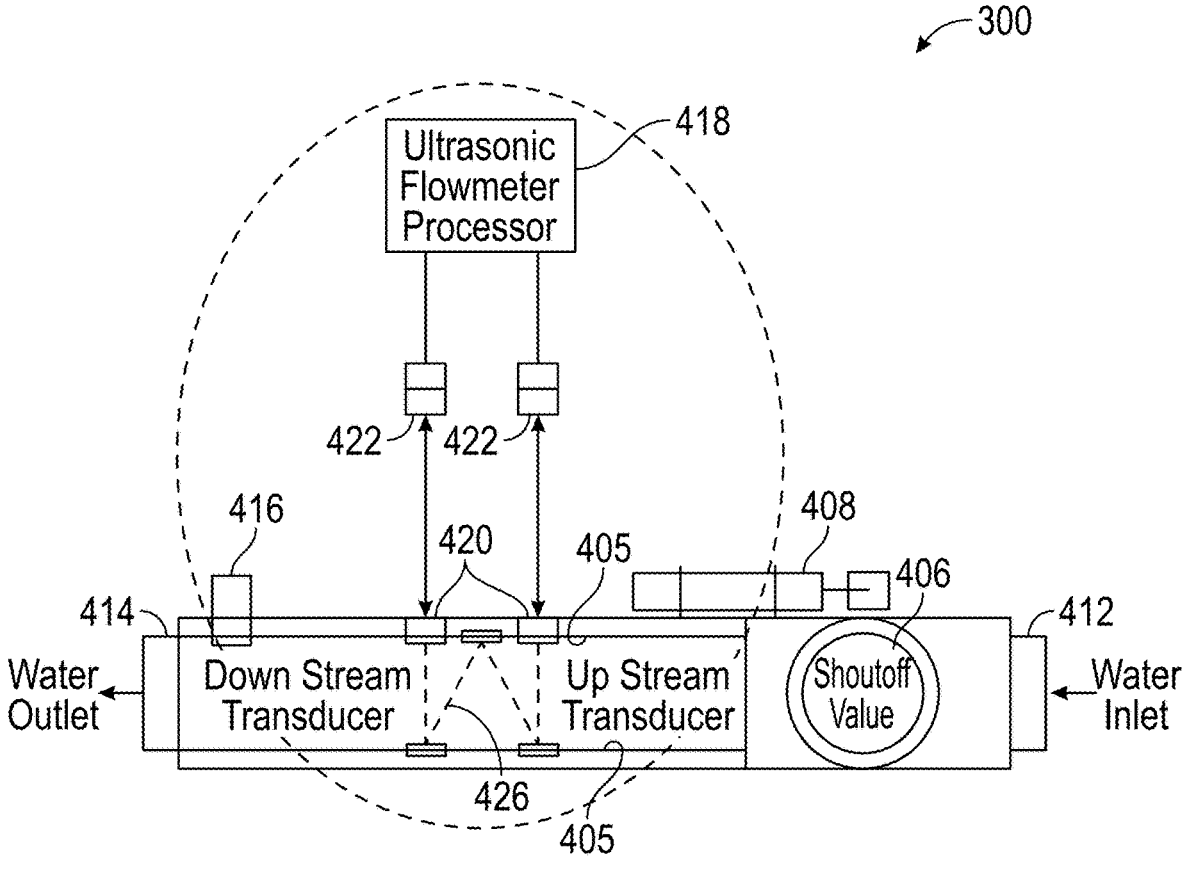
FIG. 5 illustrates reflections of an ultrasonic signal in a flowmeter housing between ultrasonic transducers.

This disclosure includes a flowmeter configured as key sub-system of the whole home water monitoring system 300 as shown in FIG. 3. FIG. 4 illustrates a system block diagram 400 of system 300 and FIG. 5 illustrates a flowmeter 500 of system 300 and is hereafter referred to as an ultrasonic W-Path flowmeter.

A system block diagram of the system 300 is shown at 400 in FIG. 4 and includes a main control board 402, a water sensor housing 404, a shutoff valve 406, a DC gearmotor 408, and processors including main control processor 410. System 300 is installed in-line between a water source, such as city water or a well, and an outlet, where a water inlet 412 is fluidly coupled to the water source such that input fluid flows through housing 404 water sensor to a water outlet 414. A combined water temperature and pressure sensor 416 provides water temperature and pressure of the water flowing through system 300 via interface 417 to the main control processor 410. The ultrasonic flowmeter processor 500 determines a water flow rate through sensor housing 404 using ultrasonic transducers 420 positioned in recesses in housing wall 405 via an ultrasonic flowmeter interface 422. The ultrasonic transducers 420 communicate an ultrasonic signal 426 along a path P between a downstream transducer 420 to an upstream transducer 420. A DC motor drive 424 controls the DC gearmotor 408 via motor drive interface 428 to control the position of shutoff valve 406. Power is provided to system 300 via power connector 430 which receives a single rail voltage VCC. Main control processor 410 is configured to communicate with external sources via USB interface 432 and interface 434. Main control processor 410 is configured to wirelessly communicate with external sources via wireless interface 436.

Figure 6:
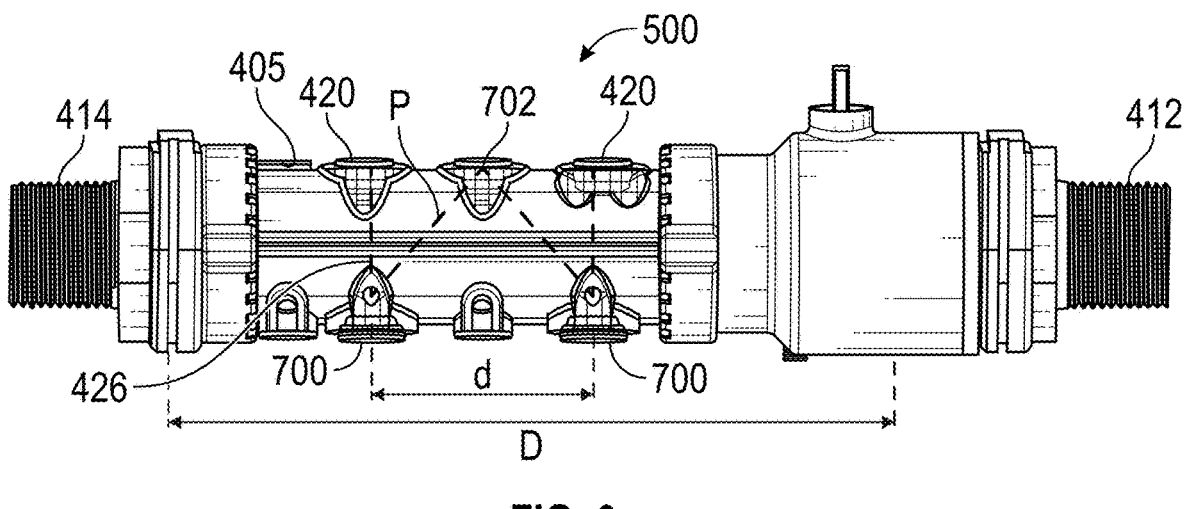
FIG. 6 illustrates the flowmeter including signal reflectors positioned in a housing.

Ultrasonic W-Path flowmeter 500 is shown in FIG. 6 that includes signal reflectors 700 and 702 positioned in housing 404 directly in the water stream, via mechanical supports, to reflect the ultrasonic signal 426 multiple times along path P from one ultrasonic transducer 420 to the other ultrasonic transducer 420. The multiple reflections create a longer overall distance D of path P through the flowing water over a linear housing distance d, resulting in improved sensitivity of time measurement $\Delta t$ between the ToFs of the ultrasonic signal 426 traveling between the transducers 420 but without the severe downside of obstructing the flow path. Distance D is the unfolded ultrasonic signal distance of path P through flowing water. In an example, the distance D is at least twice the distance d between the transducers 420 which is critical to achieve accurate time measurement of $\Delta t$ between the ToFs. It is important that the ultrasonic signal 426 is transmitted both ways between the downstream transducer 420 closest to the outlet 414 to the upstream transducer 420 closest to the inlet 412 as shown in FIG. 5 as the water flow in the housing 404 flowing downstream causes the ultrasonic signal 426 to take a longer time to reach the upstream transducer 420 as compared to sending the ultrasonic signal 426 from the upstream transducer 420 to the downstream transducer 420. In an example, it is critical to achieve a Δt from the ToFs of at least of 100 μsec to create accurate water flow rates in small form factor flowmeter 500.

Figure 7:
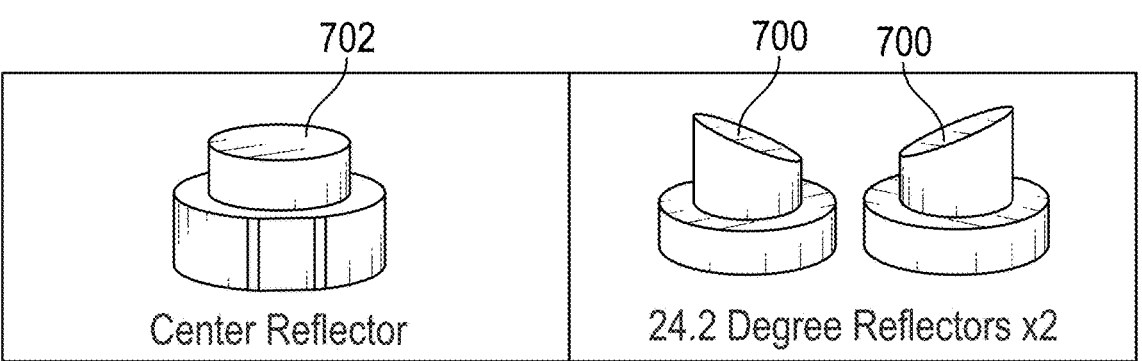
FIG. 7 illustrates two reflectors machined at an angle and a single center flat reflector.

Important features of ultrasonic W-Path flowmeter 500 include triple reflectors 700 and 702 fabricated from chrome-plated steel. The triple reflectors consist of two reflectors 700 machined at an angle and a single center flat reflector 702. Reflectors 700 and 702 are precisely engineered and keyed such that the angles of incidence and angles of reflection result in the ultrasonic signal 426 delivered cleanly along path P from one ultrasonic transducer 420 to the other. In a preferred configuration angled reflectors 700 are precisely 24.2 degrees as illustrated in FIG. 7. The reflectors 700 and 702 are inserted into wall recesses 405 wall of housing 404, positioned out of the direct water flow path and allow free flow of the fluid past the reflectors and present no obstruction of water flow. The ultrasonic signal 426 is reflected true and precisely through the entire signal path P from upstream transducer 420 to downstream transducer 420.

Figure 8:
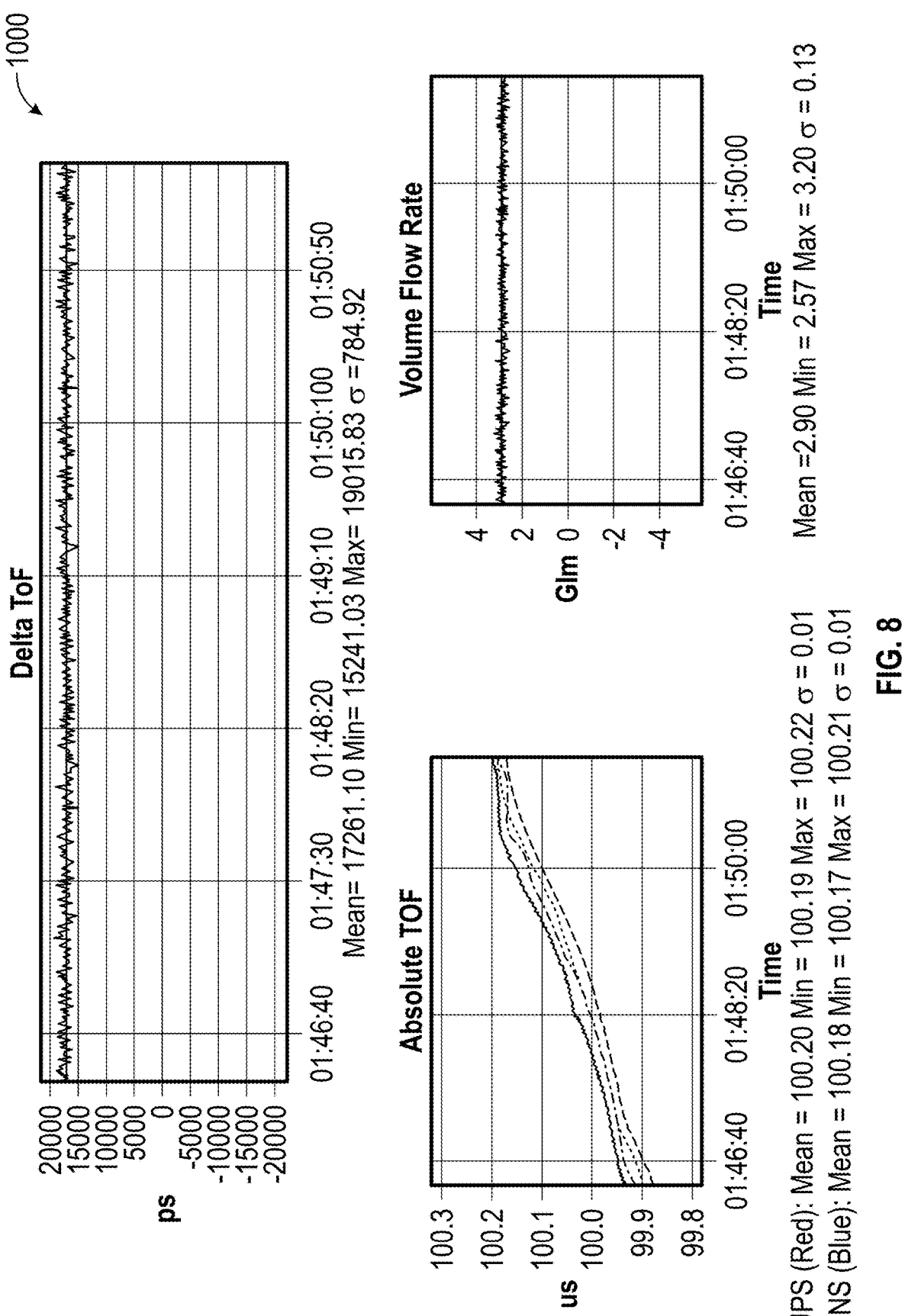
FIG. 8 illustrates shows experimental results confirming a ToF of the transducer signal greater than 100 μsec.

FIG. 8 shows experimental results confirming the superiority of the W-Path flowmeter 500 in achieving a TOF of the transduce signal 426 of greater than 100 μsec.

The appended claims set forth novel and inventive aspects of the subject matter described above, but the claims may also encompass additional subject matter not specifically recited in detail. For example, certain features, elements, or aspects may be omitted from the claims if not necessary to distinguish the novel and inventive features from what is already known to a person having ordinary skill in the art. Features, elements, and aspects described herein may also be combined or replaced by alternative features serving the same, equivalent, or similar purpose without departing from the scope of the invention defined by the appended claims.

What is claimed is:
1. A flowmeter, comprising:
a body having a wall configured to communicate a fluid between an inlet and an outlet;
a first ultrasonic transducer configured to transmit an ultrasonic signal to a second ultrasonic transducer in the body along a path in the fluid flowing through the body;
a plurality of reflectors coupled to the wall and configured to reflect the ultrasonic signal multiple times across the body along the path in the fluid flowing through the body, wherein a first of the plurality of reflectors is positioned directly across the body from the first ultrasonic transducer such that the first ultrasonic transducer is configured to transmit the ultrasonic signal in a direction perpendicular to the body wall, wherein the first reflector is angled and configured to maintain a front of the ultrasonic signal without widening the front during reflection, wherein the first reflector is recessed in the wall and configured to not obstruct the path of the fluid, and a second of the plurality of reflectors is positioned directly across the body from the second ultrasonic transducer such that the second transducer is configured to transmit the ultrasonic signal in a direction perpendicular to the body wall, wherein the second reflector is angled and configured to maintain a front of the ultrasonic signal without widening the front during reflection, wherein the second reflector is recessed in the wall and configured to not obstruct the path of the fluid; and
a processor coupled to the ultrasonic transducers and configured to determine a time that the ultrasonic signal takes to travel the path and determine a flow rate of the fluid as a function of a determined time.

2. The flowmeter of claim 1, wherein the processor is configured to determine a time difference between a time of flight (ToF) of the ultrasonic signal traveling from an upstream said ultrasonic transducer to a downstream said ultrasonic transducer, and of the ultrasonic signal traveling from the downstream ultrasonic transducer to the upstream ultrasonic transducer in the fluid.

3. The flowmeter of claim 1, wherein the ultrasonic transducers and the path are configured to cause the ToF of the ultrasonic signal to be at least 100 usec.

4. The flowmeter of claim 1, wherein a length of the path is at least double a distance between the ultrasonic transducers.

5. The flowmeter of claim 1, wherein the plurality of reflectors are configured to reflect the ultrasonic signal at least 3 times.

6. The flowmeter of claim 5, wherein the path has a W shape.

7. The flowmeter of claim 1, wherein the reflectors are comprised of reflective chrome-plated steel.

8. The flowmeter of claim 7, wherein one of the reflectors has a flat surface with respect to the housing wall and configured to receive the ultrasonic signal from one of the angled reflectors and reflect the ultrasonic signal to the other angled reflector.

9. The flowmeter of claim 8, wherein the angled reflectors are configured to reflect the ultrasonic signal at an angle of 24.2 degrees.

10. A method of operating a flowmeter having a body having a wall configured to communicate a fluid between an inlet and an outlet, an ultrasonic transducer configured to transmit an ultrasonic signal in the body to another ultrasonic transducer along a path in the fluid flowing through the body, a plurality of reflectors coupled to the wall and configured to reflect the ultrasonic signal multiple times across the body along the path in the fluid flowing through the body, wherein the first reflector is angled and configured to maintain a front of the ultrasonic signal without widening the front during reflection, wherein the first reflector is recessed in the wall and configured to not obstruct the path of the fluid, and a second of the plurality of reflectors is positioned directly across the body from the second ultrasonic transducer such that the second transducer is configured to transmit the ultrasonic signal in a direction perpendicular to the body wall, wherein the second reflector is angled and configured to maintain a front of the ultrasonic signal without widening the front during reflection, wherein the second reflector is recessed in the wall and configured to not obstruct the path of the fluid, and a processor coupled to the ultrasonic transducers and configured to determine a time that the ultrasonic signal takes to travel the path and determine a flow rate of the fluid as a function of a determined time, the method comprising the steps of:
determine the time that the ultrasonic signal takes to travel the path; and determine the flow rate of the fluid as a function of a determined time.

11. The method of claim 10, wherein the processor determines a time difference between a time of flight (ToF) of the ultrasonic signal traveling from an upstream said ultrasonic transducer to a downstream said ultrasonic transducer, and of the ultrasonic signal traveling from the downstream ultrasonic transducer to the upstream ultrasonic transducer in the fluid.

12. The method of claim 10, wherein the ultrasonic transducers and the path cause the ToF of the ultrasonic signal to be at least 100 usec.

13. The method of claim 10, wherein a length of the path is at least double a distance between the ultrasonic transducers.

14. The method of claim 10, wherein the plurality of reflectors reflect the ultrasonic signal at least 3 times.

15. The method of claim 14, wherein the path has a W shape.

16. The method of claim 10, wherein the reflectors are comprised of reflective chrome-plated steel.

17. The method of claim 16, wherein one of the reflectors has a flat surface with respect to the housing wall and receiving the ultrasonic signal from one of the angled reflectors and reflecting the ultrasonic signal to the other angled reflector.

18. The method of claim 17, wherein the angled reflectors reflect the ultrasonic signal at an angle of 24.2 degrees.

\* \* \* \* \*